Patented July 12, 1932

1,866,569

UNITED STATES PATENT OFFICE

MORRIS S. KHARASCH, OF CHICAGO, ILLINOIS

PROCESS OF PURIFYING INSULIN

No Drawing.    Application filed August 22, 1931. Serial No. 558,829.

It is the object of my invention to purify insulin simply and inexpensively.

The commercial insulin now available, when in dry form, usually has about 15 to 16 international units of potency per milligram. Insulin has been produced in purer form, and in crystalline form, with a potency of between 24 and 27 international units per milligram; but that has usually involved very complicated an expensive procedures which not only have made it commercial impractical but have usually proven incapable of being repeated by others with equal results.

By my present process it is possible to get insulin of a potency as high as that of such crystalline insulin, and to do so in a very simple and inexpensive manner which not only avoids the complications of previous processes but is substantially fool-proof.

I have discovered that the insulin principle is soluble in ammonia ($NH_3$), while the inert materials which ordinarily accompany it are substantially insoluble therein. As a result, by utilizing this differential solubility, I am able to obtain very simply and rapidly as high a purification of insulin as others have obtained by much more complicated, laborious, and trouble-producing methods.

In carrying out my invention, I treat a substantially anhydrous insulin-bearing fraction, containing the usual inert material of commercial insulin but desirably already fairly well purified by other known processes, with ammonia in substantially anhydrous liquid form. The ammonia dissolves the insulin principle and leaves most of the inert material behind as a residue. Then I separate the solution of insulin in ammonia from this residue, as by filtration or decantation; and remove the ammonia from the filtrate by evaporation, to leave behind a white solid. This white solid is itself a greatly purified insulin. A water solution of it may be made, and used in the way insulin is used.

I prefer, however, to treat this white solid further, by forming a water solution of it, and adjusting that solution to the isoelectric point of insulin—which is substantially pH3. By such adjustment, the insulin principle is precipitated; and this precipitate, when separated from the supernatant liquid as by filtration or decantation, is found to have an insulin potency of between 24 and 27 international units per milligram.

The following is an example of my process:

I take 10 g., in substantially anhydrous form, of a commercial insulin now on the market, having a potency of about 15 to 16 international units per milligram; and slowly drop that powder under substantially anhydrous conditions into a Dewar flask containing 150 cc. of substantially anhydrous liquid ammonia. The mixture is stirred for a few minutes, and then filtered under anhydrous conditions to remove the solid residue. The filtrate is liquid ammonia containing the isulin principle with relatively little inert material. The liquid ammonia is removed from this filtrate under substantially anhydrous conditions, as by allowing it to evaporate spontaneously at normal or reduced pressure. This leaves a white solid. This white solid is now dissolved in water having a hydrogen ion concentration removed from the isoelectric point of insulin, conveniently water acidulated with hydrochloric or sulphuric acid to about pH3. The solution is then appropriately adjusted to that isoelectric point, which is substantially pH5; as by careful addition of sodium hydroxide if the solution was at pH3. On such adjustment the isoelectric precipitate containing the purified insulin is obtained. This precipitate is separated from the supernatant liquid as by filtration or decantation.

It is this isoelectric precipitate which is found to have the aforesaid potency of 24 to 27 international units per milligram.

In the treatment of the original insulin fraction with ammonia, I may use either liquid ammonia alone; or liquid ammonia in a substantially anhydrous non-ionizing solvent which is miscible with water, such for instance as alcohol, acetone, or formamide; or liquid ammonia containing ingredients which are known to act either as acids, bases, or salts in the liquid-ammonia system. Among such ingredients which so act as acids in liquid ammonia are ammonium chloride, ammonium bromide, and ammonium acetate, and ammonium sulphate; among those which so act as bases in the liquid-ammonia system are sodamide ($NaNH_2$) and potassium amide ($KNH_2$); and among those which act as salts are sodium acetamide ($CH_3CONHNa$) and potassium acetamide ($CH_3CONHK$): all of which are electrolytes of the ammonia system. At present, however, I prefer to make the original ammonia extraction with either liquid ammonia alone or with liquid ammonia containing an ingredient which acts as an acid when in the liquid-ammonia system.

While I prefer to start my ammonia purification with an insulin fraction already purified to the present commercial stage, that preliminary purification is not essential.

I claim as my invention:

1. The process of purifying insulin, which consists in treating a substantially anhydrous insulin-bearing material with ammonia in substantially anhydrous liquid form, separating the solution thus obtained from the solid residue, and removing the ammonia from such solution.

2. The process of purifying insulin, which consists in treating a substantially anhydrous insulin-bearing material with ammonia in substantially anhydrous liquid form, separating the solution thus obtained from the solid residue, removing the ammonia from such solution, forming of the solid remaining after the removal of the ammonia a water solution at a hydrogen ion concentration removed from the isoelectric point of insulin, and adjusting the hydrogen ion concentration of that solution to substantially the isoelectric point of insulin to precipitate the insulin.

3. The process of purifying insulin, which consists in treating a substantially anhydrous insulin-bearing material with ammonia in substantially anhydrous liquid form containing an ingredient which acts as an acid in the ammonia system, separating the solution thus obtained from the solid residue, and removing the ammonia from such solution.

4. The process of purifying insulin, which consists in treating a substantially anhydrous insulin-bearing material with ammonia in substantially anhydrous liquid form, containing an ingredient which acts as a base in the ammonia system, separating the solution thus obtained from the solid residue, and removing the ammonia from such solution.

5. The process of purifying insulin, which consists in treating a substantially anhydrous insulin-bearing material with ammonia in substantially anhydrous liquid form containing an ingredient which acts as a salt in the ammonia system, separating the solution thus obtained from the solid residue, and removing the ammonia from such solution.

6. The process of purifying insulin, which consists in treating it with liquid ammonia.

7. The process of purifying insulin, which consists in treating a substantially anhydrous insulin-bearing material with liquid ammonia, separating the solution thus obtained from the solid residue, and removing the ammonia from such solution.

8. The process of purifying insulin, which consists in treating a substantially anhydrous insulin-bearing material with liquid ammonia containing an electrolyte of the ammonia system, separating the solution thus obtained from the solid residue, and removing the ammonia from such solution.

In witness whereof, I have hereunto set my hand at Chicago, Cook County, Illinois, this 18th day of August, 1931, A. D. one thousand nine hundred and thirty-one.

MORRIS S. KHARASCH.

CERTIFICATE OF CORRECTION.

Patent No. 1,866,569.      July 12, 1932.

MORRIS S. KHARASCH.

It is hereby certified that error appears in the printed specification of the above numbered patent requiring correction as follows: Page 1, line 10, for "an" read and; line 11, for "commercial" read commercially, and line 48, for "pH3" read pH5; and that the said Letters Patent should be read with these corrections therein that the same may conform to the record of the case in the Patent Office.

Signed and sealed this 18th day of October, A. D. 1932.

(Seal)

M. J. Moore,
Acting Commissioner of Patents.